United States Patent
Danilov et al.

(10) Patent No.: US 11,340,834 B2
(45) Date of Patent: May 24, 2022

(54) SCALING OF AN ORDERED EVENT STREAM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/881,556

(22) Filed: May 22, 2020

(65) Prior Publication Data

US 2021/0365211 A1  Nov. 25, 2021

(51) Int. Cl.
  *G06F 3/06* (2006.01)

(52) U.S. Cl.
  CPC .......... *G06F 3/0659* (2013.01); *G06F 3/0604* (2013.01); *G06F 3/0673* (2013.01)

(58) Field of Classification Search
  CPC ..... G06F 3/0659; G06F 3/0604; G06F 3/0673
  See application file for complete search history.

(56) References Cited

U.S. PATENT DOCUMENTS

| | | |
|---|---|---|
| 3,617,587 A | 11/1971 | Nayar et al. |
| 5,826,977 A | 10/1998 | Fowler et al. |
| 8,572,091 B1 | 10/2013 | Sivasubramanian et al. |
| 8,655,825 B2 | 2/2014 | Roesch et al. |
| 8,825,848 B1 | 9/2014 | Dotan et al. |

(Continued)

FOREIGN PATENT DOCUMENTS

| | | |
|---|---|---|
| CA | 2672879 | 4/2008 |
| CN | 1708029 | 12/2005 |

(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

(Continued)

*Primary Examiner* — Gary W. Cygiel
(74) *Attorney, Agent, or Firm* — Amin, Turocy & Watson, LLP

(57) ABSTRACT

Improved scaling of an ordered event stream (OES) is disclosed. In contrast to conventional scaling of an OES that, in immediate response to loading exceeding a given processor performance level, merely divides a segment into segments having similar key space size, and then determines an alternate OES topology. The alternate OES topology can be selected from among ranked alternate OES topologies. The alternate OES topology can be implemented where the expected performance will meet a threshold level of improvement over an existing OES topology. Moreover, the alternate OES topology of the disclosed subject matter can comprise two or more two new segments that can have dissimilar key space sizes. Additionally, the two or more two new segments of the alternate OES topology can provide the same, or similar, loading relative to performance levels of corresponding processing instances, even where the performance levels of corresponding processing instances are also dissimilar.

20 Claims, 10 Drawing Sheets

(56) References Cited

U.S. PATENT DOCUMENTS

| | | |
|---|---|---|
| 9,514,018 B2 | 12/2016 | Sikh |
| 9,639,589 B1 | 5/2017 | Theimer |
| 9,753,932 B1 | 9/2017 | Brow et al. |
| 9,898,482 B1 | 2/2018 | Bono |
| 9,965,215 B1 | 5/2018 | Vazhenin et al. |
| 10,565,208 B2 | 2/2020 | Triou, Jr. et al. |
| 10,860,457 B1 | 12/2020 | Evenson |
| 10,867,033 B2 | 12/2020 | Keren et al. |
| 11,016,826 B2 | 5/2021 | Lehmann |
| 11,194,638 B1 | 12/2021 | Danilov et al. |
| 2004/0199524 A1 | 10/2004 | Rys et al. |
| 2005/0055519 A1 | 3/2005 | Stuart et al. |
| 2007/0220518 A1 | 9/2007 | Verbowski et al. |
| 2008/0184262 A1 | 7/2008 | Ginis et al. |
| 2008/0301135 A1 | 12/2008 | Alves et al. |
| 2009/0182784 A1 | 7/2009 | Rohit et al. |
| 2010/0083098 A1 | 4/2010 | Leme et al. |
| 2010/0125794 A1 | 5/2010 | Hampton et al. |
| 2011/0126099 A1 | 5/2011 | Anderson et al. |
| 2011/0131588 A1 | 6/2011 | Allam et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2013/0226931 A1 | 8/2013 | Hazel et al. |
| 2013/0275808 A1 | 10/2013 | McNeeney et al. |
| 2014/0089264 A1 | 3/2014 | Talagala et al. |
| 2014/0223115 A1 | 8/2014 | Dinkjian et al. |
| 2015/0169449 A1 | 6/2015 | Barrell et al. |
| 2015/0172120 A1 | 6/2015 | Dwarampudi et al. |
| 2015/0341212 A1 | 11/2015 | Hsiao et al. |
| 2015/0363245 A1 | 12/2015 | Mutschler |
| 2016/0063080 A1 | 3/2016 | Nano et al. |
| 2016/0210061 A1 | 7/2016 | Soncodi et al. |
| 2016/0321287 A1 | 11/2016 | Luthra et al. |
| 2016/0337435 A1 | 11/2016 | Nigam et al. |
| 2016/0357476 A1 | 12/2016 | Chen et al. |
| 2017/0075832 A1 | 3/2017 | Bhimani et al. |
| 2017/0075947 A1 | 3/2017 | Kurilov et al. |
| 2017/0177263 A1 | 6/2017 | Das et al. |
| 2017/0212891 A1 | 7/2017 | Pundir et al. |
| 2018/0101842 A1 | 4/2018 | Ventura et al. |
| 2018/0121307 A1 | 5/2018 | Braun et al. |
| 2018/0176244 A1 | 6/2018 | Gervais et al. |
| 2018/0184138 A1 | 6/2018 | Shaw et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1* | 11/2018 | Paduroiu ............ H04N 21/845 |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0026301 A1 | 1/2019 | Wang et al. |
| 2019/0138494 A1 | 5/2019 | Inoue |
| 2019/0340180 A1 | 11/2019 | Barsness et al. |
| 2019/0349422 A1 | 11/2019 | Dhruvakumar et al. |
| 2020/0034468 A1 | 1/2020 | Lei et al. |
| 2020/0174695 A1 | 6/2020 | Bazarsky et al. |
| 2020/0250172 A1 | 8/2020 | Busjaeger et al. |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0110328 A1 | 4/2021 | Hsiao et al. |
| 2021/0124746 A1 | 4/2021 | Klaedtke |
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |
| 2022/0035533 A1 | 2/2022 | Danilov et al. |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation Retrieved Aug. 26, 2020, 69 pages.

"What is Apache Flink?—Applications" [https://flink.apache.org/flink-applications.html#building-blocks-for-streaming-applications]. The Apache Software Foundation Copyright 2014-2019, retrieved Aug. 26, 2020, 7 pages.

"What is Apache Flink?—Architecture" [https://flink.apache.org/flink-architecture.html]. The Apache Software Foundation Copyright 2014-2019, retrieved Aug. 26, 2020, 3 pages.

"Stateful Function—Event-driven Application on Apache Flink" [https://flink.apache.org/stateful-functions.html]. The Apache Software Foundation Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Notice of Allowance dated Jun. 28, 2021 for U.S. Appl. No. 16/884,647, 39 pages.

Notice of Allowance dated Aug. 4, 2021 for U.S. Appl. No. 17/200,652, 51 pages.

Office Action dated Oct. 1, 2021 for U.S. Appl. No. 16/915,762, 57 pages.

Office Action dated Oct. 1, 2021 for U.S. Appl. No. 17/127,724, 41 pages.

Office Action dated Nov. 10, 2021 for U.S. Appl. No. 16/944,089, 75 pages.

Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Dec. 15, 2021 for U.S. Appl. No. 17/064,747, 54 pages.

Notice of Allowance dated Feb. 4, 2022 for U.S. Appl. No. 16/915,762, 57 pages.

(56) References Cited

OTHER PUBLICATIONS

Office Action dated Jan. 21, 2022 for U.S. Appl. No. 16/864,892, 26 pages.
Notice of Allowance dated Feb. 24, 2022 for U.S. Appl. No. 17/038,079, 55 pgs.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi:10.1109/ECRTS.2008.13,2008, pp. 201-210. (Year: 2008).
Notice of Allowance dated Feb. 18, 2022 for U.S. Appl. No. 17/083,145, 70 pgs.
Office Action dated Mar. 21, 2022 for U.S. Appl. No. 16/864,905, 125 pgs.
Edi Muskardin et al., " Implementation of Hashing Algorithms in Stream Mining", International Conference on Smart Systems and Technologies (SST), Oct. 2018 , pp. 233-238.
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (loTDI), 2020, pp. 66-78, doi: 10.1109/loTDI49375.2020.00014. (Yean 2020).
Aloysius K. Mok, Honguk Woo and Chan-Gun Lee, "Probabilistic Timing Join over Uncertain Event Streams," 12th EEE International Conference on Embedded and Real-Time Computing Systems and Applications (RTCSA'06), 2006, pp. 17-26, doi: 10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi 10.1109/ICDE.2009.95. (Year: 2009).
Office Action dated Apr. 20, 2022 for U.S. Appl. No. 16/944,094, 48 pages.
Office Action dated Apr. 12, 2022 for U.S. Appl. No. 17/038,102, 48 pages.

\* cited by examiner

SCALING OF AN ORDERED EVENT STREAM

TECHNICAL FIELD

The disclosed subject matter relates to data storage and, more particularly, to scaling of an event stream of a stream data storage system.

BACKGROUND

Conventional data storage techniques can scale an event stream, e.g., bifurcating a portion of the event stream into two other portions of the event stream in response to an indication that computing resources are being sufficiently burdened. In a conventional system, the two other portions are each about 50% of the initial event stream. One use of data storage is in bulk data storage. Conventional scaling of an event stream of a stream data storage system can result in inefficient use of computing resources. Accordingly, adapting scaling technology employed in a stream data storage system can improve said stream data storage system itself, such as by providing improved use of computing resources in contrast to a conventional stream data storage system.

DETAILED DESCRIPTION

Figure 1:
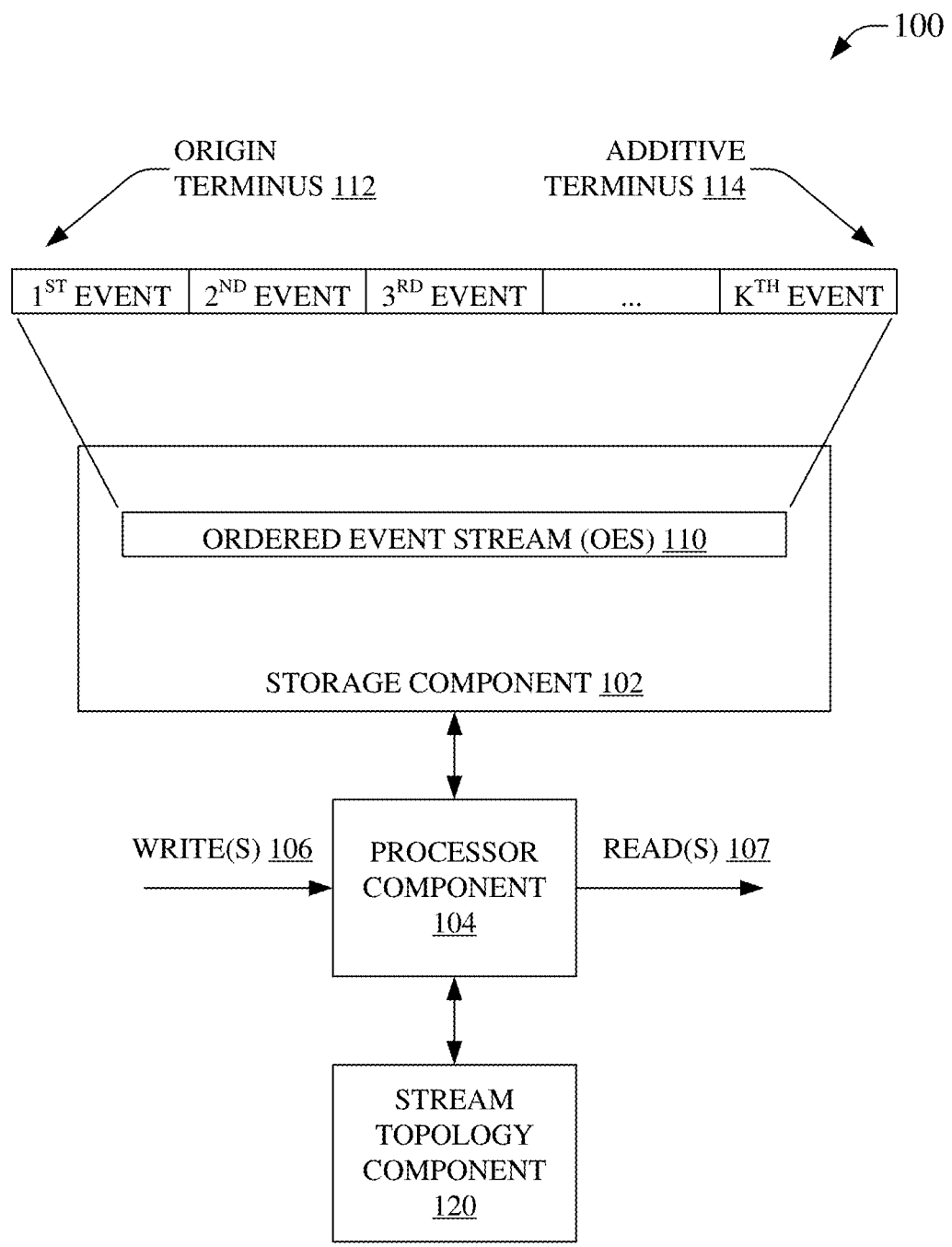
FIG. 1 is an illustration of an example system that can facilitate scaling of an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, conventional event stream storage techniques, for example, can scale an event stream via bifurcation of a portion of the event stream into two other event stream portions. This can be in in prompt response to an indication that computing resources are being sufficiently burdened. In a conventional system, these two other portions can represent an approximately even split of the initial event stream, e.g., each of the two resulting event stream portions can be about one half of the initial event stream in an attempt to divide the amount of computing resources used in the initial stream about evenly between the initial computing resources and newly added additional computing resources. As an example, if an initial event stream causes a load of two units of work for a first processor, the two units of work load are correspond to an even distribution of work across the associated key space of the initial event stream, and the two units of work exceed a threshold work level of the first processor, the stream can be split and a second processor can be added, such that the first processor now supports a second stream, in lieu of the initial stream, at about one unit of work and a third stream can be supported at about one unit of work by a the second processor, again, assuming the work load from the initial stream was distributed roughly evenly across the key space of the initial event stream. In an aspect, conventional stream storage technology can simply divide an event stream evenly to distribute the work of supporting the event stream. This can be termed, scaling of an event stream. In conventional stream storage technology, the scaling of the event stream can be in response to a threshold consumption of computing resources, e.g., when a threshold work level is traversed, an event stream is scaled. Moreover, the scaling is generally mere equal division of the event stream and is typically ignorant of the distribution of work across the key space of the event stream, e.g., splitting an event stream, or portion thereof, into two or more roughly equal parts each taking roughly half of the key space of the event stream or the portion thereof. These aspects of conventional stream storage technology are somewhat rudimentary and improvement of scaling technology for an event stream system can improve the operation of the event stream system itself. As is further disclosed herein below, for example, triggering scaling of an event stream can be based on determining a projected benefit level, can result in asymmetric division of an event stream key space, can be conditioned on a performance metric of additional computing resources that can support a scaled event stream, etc. Accordingly, adapting scaling technology employed in a stream data storage system can improve the performance of the stream data storage system itself and, as such, can be desirable in contrast to a conventional stream data storage system.

In an aspect, the presently disclosed subject matter can improve, over conventional event stream storage system technology, scaling of an event stream or portion thereof, hereinafter simply an event stream unless otherwise inherently or explicitly indicating otherwise. An event stream, or a stream for convenience, can be a durable, elastic, append-only, unbounded sequence of so-called events. An example of an ordered event streaming storage platform can be STREAMING DATA PLATFORM (SDP) by DELL EMC. An event can be added to a head of a stream of events, e.g., a first event can be considered at a tail of the event stream and a most recent event can be regarded as at the head of the stream with other events ordered between the tail and the head of the stream. Every event of the stream has a routing key, or simply key for convenience. A key can often be derived from data of the event, e.g., a "machine-id," "location," "device type," "customer number," "vehicle identifier," etc. As such, events with the same routing key can be consumed, e.g., read, in the order they were written.

A stream can be comprised of a set of portions, e.g., shards, partitions, pieces, etc., that can generally referred to as stream segments, or simply segments for convenience. The segments can act as logical containers for one or more events within a stream. When a new event is written to a stream, it can be stored to a segment of the stream based on a corresponding key. Event routing keys can be hashed to form a "key space". The key space can be employed to divide the stream into a number of parts, e.g., segments. In some embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space of the event, e.g., from zero to 'n', can be associated with the two segments, however each of the two segments can be associated with a portion of the total key space, for example, the first segment can store events with a key between zero and 'm' and the second segment can store events with a key between 'm+1' and 'n'. It will be appreciated that more segments can serve to further divide the key space such that a segment can store an event with a key falling within the range of the key space associated with that segment. As an example, a four segment event stream can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In an aspect, a segment of an event stream is generally associated with a single processing instance to assure ordering of the events stored in the segment. A processing instance can be a single real physical processor, a virtualized processor executing on one or more real physical processors, a group of real physical processors, a group pf virtual processors executing on one or more real physical processors, etc. As an example, a processing instance can be a blade server of a rack system. As another example, a processing instance can be a virtual processor deployed in an elastic computing system, e.g., a 'cloud server,' etc.

Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, etc. As such, selecting an appropriate processing instance can be associated with optimizing cost. As an example, if an event stream always consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In an aspect, a segment can be scaled where a threshold performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, the segment can be scaled, e.g., split into two daughter segments, such that each daughter segment can be associated with events for half of the key space of the parent segment before scaling. In this example, where the daughter segments are each associated with a processing instance that can perform one unit of work, and where the key space of the initial segment has a generally even distribution of work, then each daughter segment, for example, can be associate with about 0.75 units of work, e.g., the parent segment now consumes at 1.5 units, e.g., exceeding the capacity of the existing processing instance, and the parent segment can be split into two daughter segments at about 0.75 units each where each daughter segment can now consume less than the one unit of work available through their corresponding processing instances.

In an aspect, there can be additional processing, reassignment of reading instances that read events from the segment(s) of the stream, reassignment of writing instances that write events into the segment(s) of the stream, etc., effort and expense spooling up/down processing instances, etc. As such, scaling is generally not performed without impact on an event stream storage system. Accordingly, scaling during an intermittent change in demand for computing resources, e.g., intermittent increases/decreases in needed work capacity for a stream segment, can be disfavored, though it can be performed as is needed. As such, it can be desirable to perform scaling when there is a determined longer term benefit. As such, a threshold value less than the maximum work that can be performed by a computing instance can be associated with determining if a scaling event will be undertaken. Returning to the above example, where the parent segment reached 80% of the one unit of work available through the corresponding processing instance, a benefit value of scaling the segment can be determined. Where the benefit value satisfies a scaling rule, the parent segment can then be scaled into the example daughter segments. The benefit value can be determined based on the expected performance of the daughter segments. As an example, if the parent segment reaches 80% consumption of computing resources, e.g., 80% work, then where the key space is evenly distributed, each daughter can be expected to inherit 40% consumption of the computing resources where each processing instance is generally capable of about one unit of work. This results in each processing instance consuming 40% less work and leaves sufficient available computing resources to allow for further increase in each of the daughter segments that could be difficult to manage if the parent segment is not scaled. This level of improvement and the resulting daughter segments being under the threshold 80% consumption of corresponding processing instance resources can be determined to satisfy the scaling rule and the segment can be scaled up. It is noted that the daughter segments can later be scaled down, e.g., combined into a single segment, combined with other segments, etc., for example, where the daughter segments begin to consume less that, for example, 20% of the available computing resources, they can be scaled down into one granddaughter segment that can consume 40% of a single processing instance. Further discussion of scaling down is generally not discussed herein for clarity and brevity, however it is expressly noted that scaling down is fully supported by the disclosed subject matter and is accordingly within the scope of the instant disclosure.

In an aspect, distribution of events in a key space can be non-uniform. This non-uniformity can be problematic for conventional event stream storage systems. As an example, if an event stream has one segment that begins to consume 0.9 units of computing resources and is supported by a processing instance that can provide one unit of work with a scaling threshold value of 0.8 units, scaling can result in two daughter segments that each can consume 0.45 units of work where the work is generally evenly distributed across the key space of the parent segment, e.g., as is illustrated in an above example. However, where the distribution of work is non-uniform across the key space of the segment, for example where 0.8 units of the demand occurs in the lower half of the key space for the parent stream and only 0.1 units occurs in the upper half of the key space, then dividing the key space into daughters through symmetrical scaling, e.g., one taking the bottom half and one taking the top half of the key space, can result in one daughter segment having 0.8 units of demand and the other daughter segment having 0.1 units of demand. The daughter having 0.8 units of demand can already be ready for further scaling where the scaling threshold is 0.8 units. Use of asymmetric scaling, as disclosed herein below, can result in a more equitable scaling, e.g., the first daughter can inherit a portion of the parent key space having a work demand similar to the work demand from the balance of the parent key space. As such, the key space can be assigned to the daughter segments asymmetrically to enable balancing of work demanded by the resulting daughter segments.

In an aspect, the pre-scaling check, as is disclosed elsewhere herein in more detail, can be performed with threshold values that are more forgiving than can be employed in conventional systems. In a conventional system, a scaling threshold can be selected to be near a maximum burdening of a processing instance such that when the threshold is traversed scaling occurs. In contrast, a different, perhaps more forgiving, threshold can be selected for a pre-scaling check, such that alternate OES topologies can be determined, ranked, and a candidate alternate topology selected prior to committing to a scaling operation. As such, the alternate topology can be ready to be implemented should scaling be determined to be necessary. Additionally, a critical threshold can also be set, such that if an alternate OES topology is not selected prior to the work load transitioning the critical threshold, the system can fail over to simply dividing the segment in a conventional manner to avoid overburdening a corresponding processing instance.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate scaling of an ordered event stream, in accordance with aspects of the subject disclosure. System 100 can comprise a storage component 102 that can store an ordered event stream (OES) 110. OES 110 can store one or more events. An event is associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner. Similarly, events with a same key can be read from OES 110 in an ordered manner, e.g., in the order they were previously written into OES 110. Components providing events to be written can be termed 'writers' and components requesting events can be termed 'readers'. As such, a writer can provide an event that can be written to OES 110 in an ordered manner based on a key associated with the event. Similarly, a reader can receive an event from OES 110 based on a key.

Processor component 104 of a system 100 can receive write(s) 106 that can be written to OES 110 stored on storage component 102. Processor component 104 of a system 100 can provide access to events of OES 110 based on a key, e.g., as read(s) 107 that can be communicated to a reader. Generally, one processing instance, e.g., processor component 104, etc., is designated for writing events to a portion, e.g., segment, of OES 110. OES 110 can comprise one segment and/or parallel segments, e.g., stream segments, see FIG. 2, etc., that can store events according to a key. In an aspect, more than one processing instance writing to a segment of an OES is typically disfavored because it can increase the difficulty of writing incoming events in an ordered manner. However, a given processing instance can read/write to more than one OES segment, e.g., a given processing instance can write to one or more OES s, to one or more segments of one OES, to one or more segments of one or more OES s, etc. As such, for a given number of segments there can typically be up to the same number of processing instances. Although adding more processing instances is allowable, these additional processing instances are generally idle in order to avoid scrambling an order of events being written to a segment. It is further noted that system 100 can comprise idle processing instances, for example as reserve processing instances for failover where an active processing instance becomes less responsive, etc. In an aspect, keys of one or more segments of an OES can represent a key space for OES 110, see FIG. 2, etc. Segments can therefore act as logical containers associated with a particular range of keys for an event stream and can be used to store events within OES 110. When a new event is written to a stream, it can be stored to one of the segments based on the event key. In an aspect, the key space can be divided into a number of ranges that can correspond to the number of segments of comprising OES 110. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the second event in the first segment, etc.

OES 110, as illustrated in system 100, can be simplistic example of an OES that can comprise just one segment for storing incoming event write(s) 106 and sourcing event read(s) 107, and therefore the key space of OES 110 can be embodied in the example single segment of events, e.g., the key space of OES 110 is not illustrated as being distributed across more than one parallel event storage segment. OES 110 can have an origin terminus 112. A first event can be written at origin terminus 112. The subsequent events can then be appended at an additive terminus 114 that is typically always at the head of the stream of written ordered events, e.g., a most recent event is written to the head of OES 110, which provides ordering of the events being written. This results in OES 110 allowing for continuous and unbounded data storage that can be a durable, elastic, append-only, unbounded sequence of events. As an example, a $(K+1)^{th}$ event can be appended to the $K^{th}$ event of OES 110 at additive terminus 114. In an aspect, storage component 102 can store any number of OESs. Moreover, any one OES can comprise any number of parallel segments, e.g., stings of events for a defined key space range. Each segment can comprise an ordered sequence of stored events.

In system 100, stream topology component 120 can facilitate adapting a topology of one or more OESs. In an aspect, the adapting of the topology can comprise scaling of OES 110. Scaling can comprise 'scaling up,' e.g., increasing a count of parallel segments of OES 110, 'scaling down,' e.g., decreasing a count of parallel segments of OES 110, etc. As an example, increasing a number of parallel segments of OES 110 can result in division of the key space of OES 110 from one segment to two or more parallel segments. In an aspect, it can be desirable to scale up a segment of an OES, e.g., OES 110, when a threshold consumption of computing resources is transitioned. The threshold consumption of computing resources can, in an embodiment, correspond to a level of performance of a related processing instance, e.g., processor component 104. As an example, if a processing instance, e.g., processor component 104, can perform 100 million operations per day, e.g., reads, writes, etc., an example threshold of 80 million operations can be selected. Accordingly, in this example, where OES 110 generally performs less than 80 million operations per day, scaling of OES 110 can be determined to be unnecessary. However, in this example, where events for OES 110 increase, for example to 82 million operations per day, scaling of OES 110, e.g., scaling up, can be indicated, for example to avoid overburdening processor component 104, etc.

Where scaling of OES 110, in the above example, is determined to be appropriate, stream topology component 120 can facilitate altering the topology of OES 110 from one segment to two or more parallel segments. This can result in dividing the key space of OES 110 among the now plural parallel segments. In an aspect, processor component 104 can continue to perform all operations for the parallel segments, e.g., processor component 104 can read/write to more than one segment of events as is noted elsewhere herein. However, in some embodiments, one or more additional processing instances can be deployed to provide additional computing resources. It is noted that adding an additional processing instance without scaling up OES 110 can result in the newly added processing instance remaining idle because more than one processing instance is typically not allowed to write events into a segment of an OES to prevent scrambling the order of events. However, upon scaling up OES 110, for example, to two parallel segments, the addition of another processing instance can now be dedicated to one of the two parallel segments, e.g., one segment can typically be supported by up to one processing instance, two segments can be supported by up to two processing instances, three segments can be supported by up to three processing instances, . . . , w segments can be supported by up to w processing instances, etc.

Scaling up can be increase a count of parallel segments of OES 110. There can also be an increase in the count of processing instances, e.g., additional instances of processor component 104 that are not illustrated. Scaling up can be enabled via stream topology component 120, e.g., based on one or more OES characteristics (OESCs), Based on storage system KPIs, etc. Example OES characteristics can comprise a current computing resource demand, a count of segments, a distribution of work among the segments, a topology of an OES, a historical workload of one or more segments of an OES, etc. Example storage system KPIs can comprise loading of a processing instance, e.g., how heavily burdened is processor component 104, etc., threshold values for current and/or available computing resources, etc. Similarly, scaling down can be supported by stream topology component 120. As an example, where the number of operations performed in two parallel segments decreases, the lower levels of work being performed can be viewed as wasteful of processing instances allocated to these two example stream segments. As such, the segments can be condensed and one of the processing instances can be released. In some embodiments, the superfluous processing instance can be released without condensing the two example streams, e.g., there is generally no prohibition to one processing instance supporting two stream segments. While scaling down is not discussed at length for the sake of clarity and brevity, scaling down can be complementary to scaling up and all such complimentary operations are fully supported ty the instant disclosure and are asserted as being within the scope thereof. It is further noted that scaling up/down is generally associated with additional temporary burdening of computation resources, e.g., to remap reader(s) and/or writer(s) from a pre-scaling topology to an after-scaling topology, sealing pre-scaling segments, instantiating and/or releasing processing instances, providing a connection (bridging) between events of a pre-scaling stream to events of a prost-scaling stream, etc. As such, it is generally undesirable to arbitrarily scale OES 110. Accordingly, scaling can be initiated in response to determining that the scaling likely will result in a topology that is determined to satisfy a scaling rule, as is discussed elsewhere herein.

Figure 2:
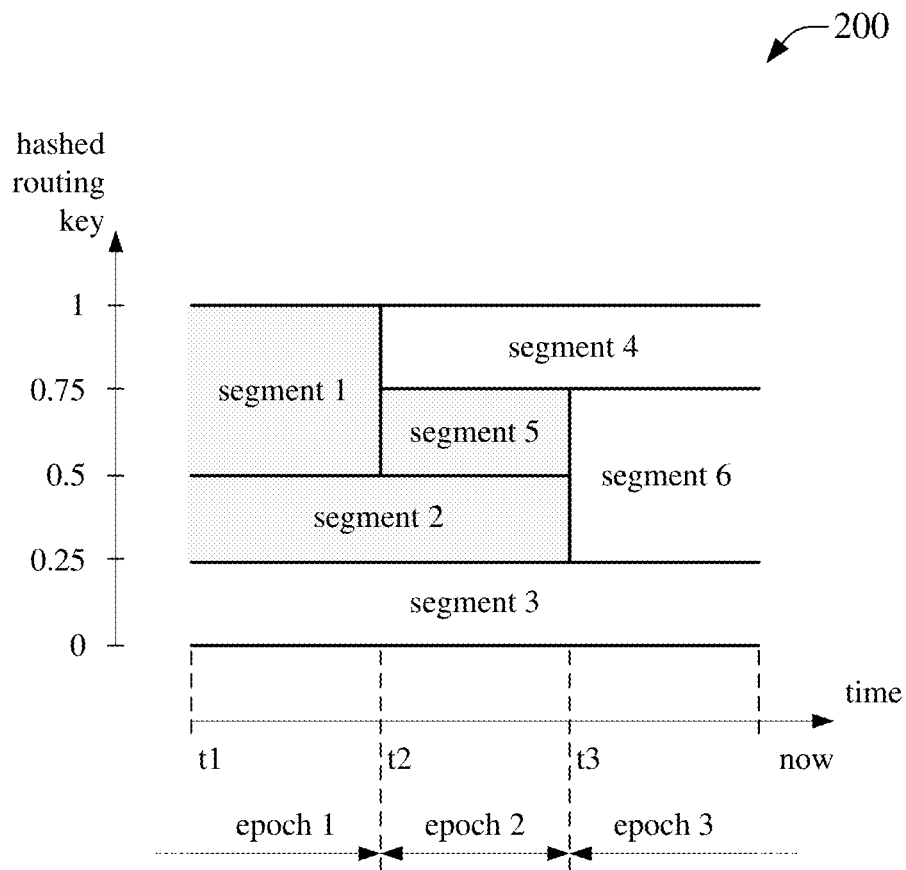
FIG. 2 is an illustration of an example scaling of an ordered event stream, in accordance with aspects of the subject disclosure.

FIG. 2 is an illustration of an example scaling of an ordered event stream 200, in accordance with aspects of the subject disclosure. Ordered event stream 200 can comprise segments. At a first time, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1-3 pre-scaling can be designated as epoch 1. Similarly, the topology of the OES comprising segments 4-5 and 2-3 can be designated as epoch 2.

In an aspect, segments 2 and 3 are continuous across epochs 1 and 2 while segment 1 ends at the transition from epoch 1 to 2. In an aspect, in epoch 1, events associated with a key between 0.5 and 1, e.g., 0.5>key≥1, can be written (and read from) segment 1, while in epoch 2, events associated with a key between 0.75 and 1, e.g., 0.75>key≥1.0, can be written (and read from) segment 4 and events associated with a key between 0.5 and 0.75, e.g., 0.5>key≥0.75, can be written (and read from) segment 5. As such, access to events for a given key can be associated with reads in different epochs. As an example, reading an event with a key of 0.8 can read from both segment 1 and segment 4. Where the read is from head to tail, the read of example events with a key of 0.8 can begin reading in segment 4 and then continue reading into segment 1 across the epoch boundary between epoch 2 and 1. Similarly, where the read is from tail to head, events associated with the example key of 0.8 can begin in segment 1 and continue into segment 4 across the epoch boundary. However, it is noted that generally no additional events are written into segment 1 after the scaling event is committed and a new epoch is begun.

In epoch 2, the topology of OES 200 can comprise segments 4-5 and 2-3. At some point further scaling can be undertaken, e.g., at t3. OES 200 can, for example, scale down by condensing segment 2 and 5 into segment 6 at t3. This example scaling down can reduce a count of segments comprising OES 200. The scaling at t3 can result in ending epoch 2 and beginning epoch 3. The example scaling can cayuse segment 6 and can close segments 2 and 5. As such, in epoch 3, the topology of the OES comprising segments 3-4 and 6 post-scaling can distribute the key space of OES 200, for example, as 0≤segment 3>0.25, 0.25>segment 6≥0.75, and 0.75>segment 4≥1.0.

Figure 3:
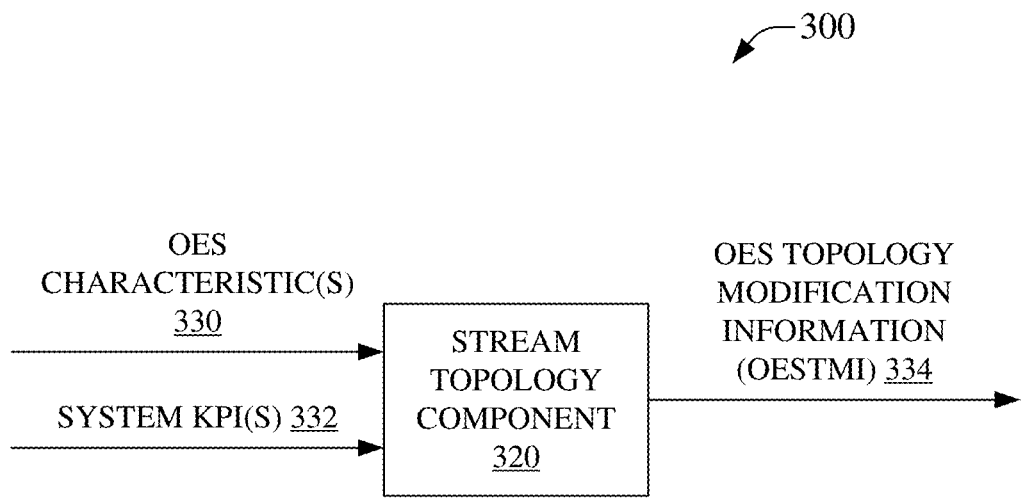
FIG. 3 illustrates an example system that can facilitate scaling of an ordered event stream based on an OES characteristic and a storage system key performance indicator, in accordance with aspects of the subject disclosure.
Figure 3:
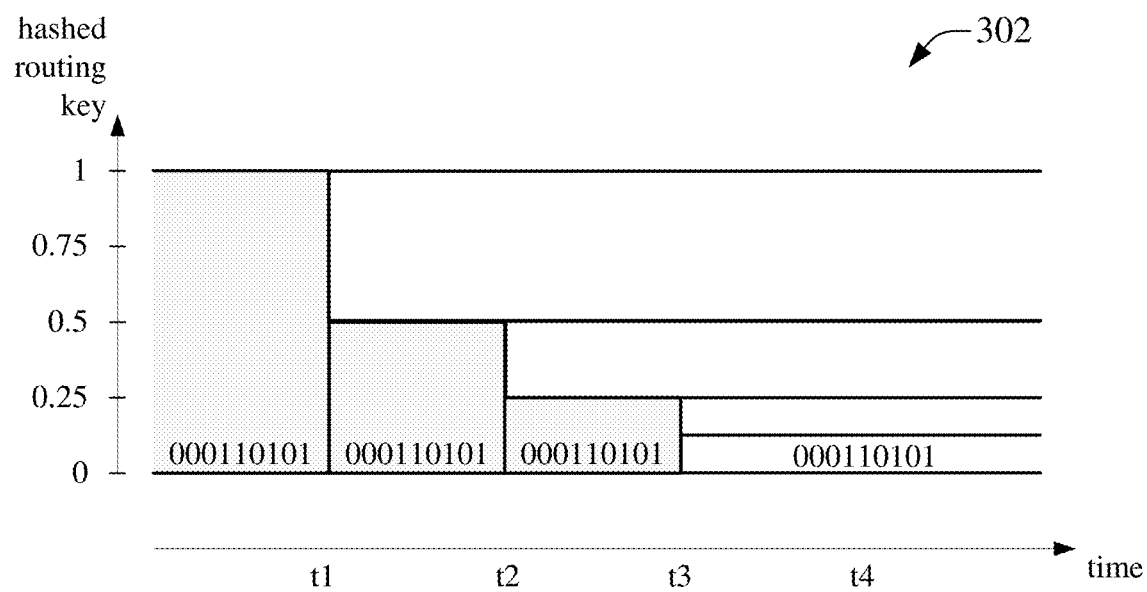

FIG. 3 is an illustration of a system 300, which can facilitate scaling of an ordered event stream based on an OES characteristic and a storage system key performance indicator (KPI), in accordance with aspects of the subject disclosure. System 300 can comprise stream topology component 320. Stream topology component 320 can receive information related to characteristics of an event storage system, such as current OES characteristic(s) 330, system KPI(s) 332, etc. Current OES characteristic(s) 330, for example, can comprise a topology of an OES, a current work load of an OES, a current performance of an OES, historical information for the OES such as historical work load(s), historical performance, etc. System KPI(s) 332, for example, can comprise processing instance performance indicators, historical processing instance performance indicators, availability of additional performance instance(s) and/or corresponding performance indicators, etc.

In an aspect, these or other inputs to stream topology component 320 can be understood to represent what computing resources are available, how burdened are said computing resources now and/or in the past, what future computing resources can be needed, what future computing resources are available for implementation, etc. This type of information can be employed to determine if the OES topology should be adapted, how it should be adapted, and when it should be adapted. As an example, if an OES is storing customer data for a local company, the OES footprint might be relatively small and can be supported with low end processing instances in a simple OES topology. However, in this example, as the company grows to a national level there can be in increase in the amount of work performed, e.g., more event writes and reads. This can increase to a level that begins to tax the initially dedicated computing resources, e.g., the initial processing instance can begin to approach a threshold performance level. In an aspect, for this example, the historical increase in demand for computing resources can be employed by stream topology component 320 to predict that demand will outpace supply of computing resources and alternate topologies can be determined. These alternate topologies can be score and/or ranked. An alternate topology, for example, a topology that scales up the OES and adds an additional processing instance, etc., can be selected based on the corresponding score, rank against other alternate topologies, etc. Accordingly, in this example, stream topology component 320 can generate OES topology modification information (OESTMI) 334 that can facilitate scaling of the example OES, e.g., according to the selected topology that scales up the OES segments and adds the additional processing instance. Similarly, as the example company continues to grow, perhaps to an international level, further topological alterations can be determined via stream topology component 320 to allow the OES to perform appropriately for the expanding company.

In an aspect, not all increases in demand for computing resources by an OES can be solved with conventional bifurcation of a segment into two segments having equal and complimentary key space sizes. As an example, a topography of an OES is indicated at 302. In example 302, a demand for an amount of computing resources is indicated by '000110101' for events with keys between 0 and 0.25 and, in this example, the demand can be burdensome to a processing resource such that it would be desirable to add computing resources in association with scaling up the OES. It is noted that in example 302 there other portions of the key space, e.g., between 0.25 and 1.0 are shown as not experiencing significant computing resource demand, e.g., there can be a huge number of writes/reads for events with a key of 0.08 while there are few, if any, writes/reads for events having other keys. While example 302 is a bit contrived, it is intended to illustrate that very high demand for a limited portion of OES key space can be problematic under conventional stream technologies. In a conventional stream system, the high demand, for example at 0.08 at time t1 can trigger bifurcation of the segment into two complementary segments of equal key space size, e.g., between t1 and t2 there can be a first segment from 0 to 0.5 and a second segment from 0.5-1.0, however the high demand remains in the first segment because the 0.08 key is between 0 and 0.5. As such, at t2, further bifurcation can be triggered to again attempt to alleviate the high demand for computing resources, which can result in three segments that cover 0 to 0.25, 0.25 to 0.5, and 05-1.0 respectively. However the segment from 0-0.25 remains overburdened because the demand is at a key of 0.08. Yet again, at t3, an additional scaling can occur in example 302, which can be in response to the high demand remaining at 0.08 of the key space and can result in addition of another segment from 0 to 0.125 and from 0.125 to 0.25, but this again does not solve the high burden at 0.08. As such, this example can indicate that the multiple scaling events and the overhead associated with performing the several conventional scaling did not solve the underlying problem of high levels of work relating to events with a key of 0.08 occurring.

In view of example 302, it can be desirable to determine if the scaling event can be expected to provide a desired level of benefit before committing resources to perform adaptation of an OES topology. In an aspect, stream topology component 320 can receive measurements relating to, or can measure, load produced by an $i^{th}$ segment of an OES, e.g., via OES characteristics(s) 330 and/or system KPI(s) 332, etc. The load produced by the $i^{th}$ segment can be denoted $L_i$. It can be understood that an event stream storage system can scale an OES, or portion thereof, e.g., a segment, when the segment load exceeds some predefined threshold, as has been previously disclosed. However, the range of keys can be analyzed for two sub-ranges to measure and determine the load independently for of the two sub-ranges, e.g., $L_i^1$ and $L_i^2$, where $L_i^1 + L_i^2 = L_i$. As such, when $L_i$ transitions a threshold level, e.g., the load on the $i^{th}$ segment is sufficiently high to warrant considering a scaling event, the two subranges can be determined and analyzed before committing to the scaling event. Returning to example 302, the high load in the first segment before t1 can cause stream topology component 320 to determine $L_i^1$ and $L_i^2$ where $L_i^1$ covers the key space from 0 to 0.5 and $L_i^2$ covers the key space from 0.5 to 1.0. In an aspect, $L_i^1$ and $L_i^2$ can represent a possible alternate OES topology, e.g., a topology with two segments resulting from possibly scaling one segment of an OES, wherein the topology scaling employs equal sized and complementary scaled segments. The load of these two sub-ranges can be analyzed before committing the scaling to determine if they will achieve the desired result, e.g., will satisfy a scaling rule.

The 'scaling pre-check,' e.g., determining satisfaction of the scaling rule, can, for example, be based on a selectable improvement threshold value. The selectable improvement threshold value can be denoted as 'SITV,' such that scaling up is permitted where $\max(L_i^1, L_i^2) < (1-SITV)*L_i$. For example, if SITV is 0.3, e.g., 30%, then scaling up is enabled only when it assures per-segment load reduction by at least 30%. Where, in this example, there is not at least a 30% reduction in per-segment load, scaling up is blocked because it would give too small effect. It is noted that other values of SITV can be selected or determined. In an aspect, this scaling pre-check, if applied to example 302 where conventional complementary and equal key space sized sub-ranges are selected, would have prevented scaling of the system because there would have been no notable improvement in the per segment load as is noted hereinabove where the scaling was not effective for example 302. However, in an aspect, the sub-ranges can be complementary but other than equal in size, as an example, $L_i^1$ and $L_i^2$ can be selected where $L_i^1$ covers the key space from 0 to 0.05 and $L_i^2$ covers the key space from 0.05 to 1.0. In some instances, this dissimilar size can allow for beneficial bifurcation. In an aspect, dissimilar sized $L_i^1$ and $L_i^2$ can represent a possible alternate OES topology. Moreover, in an aspect, there can be more than two sub-ranges that can be 'complementary' and can be equal or different in in size, as an example, $L_i = L_i^1 + L_i^2 + L_i^3$, where $L_i^1$ covers the key space from 0 to 0.10, $L_i^2$ covers the key space from 0.10 to 0.20, and $L_i^3$ covers the key space from 0.20 to 1.0, and where $\max(L_i^1, L_i^2, L_i^3) < (1-SITV)*L_i$. In an aspect, $L_i^1$, $L_i^2$, and $L_i^3$ can represent another possible alternate OES topology, e.g., a topology with three segments. In some instances, scaling with more than two sub-regions can allow for beneficial scaling of the OES.

Figure 4:
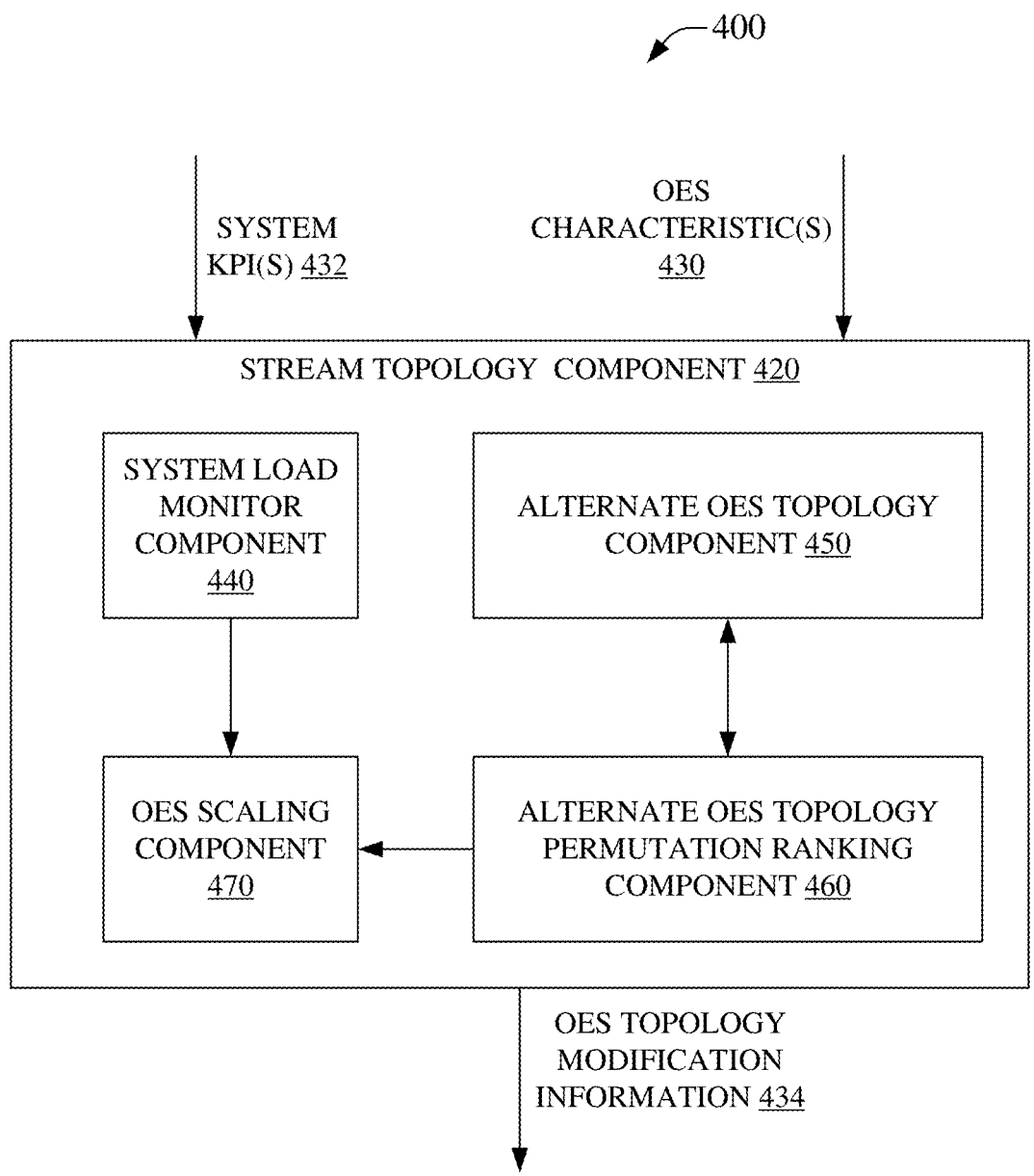
FIG. 4 is an illustration of an example system that can enable scaling of an ordered event stream based on an alternate OES topology, in accordance with aspects of the subject disclosure.

FIG. 4 is an illustration of a system 400 that can enable scaling of an ordered event stream based on an alternate OES topology, in accordance with aspects of the subject disclosure. System 400 can comprise stream topology component 420 that can receive information relating to an OES and/or KPIs of a OES storage system, e.g., current OES characteristic(s) 430, system KPI(s) 432, etc. Current OES characteristic(s) 430, for example, can comprise a topology of an OES, a current work load of an OES, a current performance of an OES, historical information for the OES such as historical work load(s), historical performance, etc. System KPI(s) 432, for example, can comprise processing instance performance indicators, historical processing instance performance indicators, availability of additional performance instance(s) and/or corresponding performance indicators, etc. Stream topology component 420 can generate OESTMI 434 that can facilitate altering a topology of an OES, e.g., scaling an OES or portion thereof. Stream topology component 420 can comprise system load monitor component 440 that can monitor a load of a segment(s) of an OES, e.g., e.g., can receive measurements relating to, or can measure, load produced by an $i^{th}$ segment of an OES, e.g., via OES characteristics(s) 430 and/or system KPI(s) 432, etc.

Alternate OES topologies can be determined via alternate OES topology component 450, e.g., based on OES characteristics(s) 430 and/or system KPI(s) 432, etc. These alternate topologies can be analyzed by alternate OES topology permutation ranking component 460, hereinafter ranking component 460 for simplicity. In an aspect, ranking component 460 can, in some embodiments, determine a load on a possible alternate topology segment(s), e.g., a load on an alternative segment having a sub-range of keys, e.g., $L_i^1$, $L_i^2$, etc. Alternate topologies can be determined via alternate OES topology component 450 and analyzed via ranking component 460 before committing to a scaling event. The load of these sub-ranges can be analyzed, for example, to determine if they will achieve a desired result, e.g., will satisfy a scaling rule, for example, $\max(L_i^1, L_i^2, \text{etc.}) < (1-SITV)*L_i$.

At alternate OES topology component 450, $L_i$ can be divided into n segment parts $(L_i^1 \ldots L_i^n)$ and these segment parts can be combined into different alternate topologies, e.g., topological permutations. As an example, an initial segment can be divided in to n=8 parts and a first alternate topology can comprise two segments, SA and SB, where SA comprises parts 1 to 4 while SB can comprise parts 5 to 8. In this example a second alternate topology can comprise two segments, SC and SD, where SC comprises pats 1-3 and SD comprises parts 4-8. Yet a third alternate topology in this example can comprise three segments, SE, SF, and SG, where SE comprises parts 1-2, SF comprises parts 3-7, and SG comprises part 8. As will be appreciated, the n parts can be combined in various permutations that can comprise different numbers of segments of the same and/or different sizes while still providing full coverage for the key space.

The alternate OES topologies determined via alternate OES topology component 450 can then be analyzed via alternate OES topology permutation ranking component 460, for example, to determine if they satisfy a scaling rule, to determine loading of segments comprising an alternate topology, etc. The several alternate topologies can then be scored and/or ranked. As an example, a first alternate topology can be predicted to yield a 50% reduction in work load, a second alternate topology can be predicted to yield a 30% reduction in work load, and a third alternate topology can be predicted to yield a 0% reduction in work load, whereby the ranking, for example, can favor the 50% reduction and least favor, or even eliminate, the 0% reduction. As a further example, such as where three segments will result from scaling of an initial segment, the ranking, for example, can perform a first ranking according to a work load reduction between two of the three segments and then perform a second ranking according to another work load reduction between the remaining two of the three segments. In this example, splitting into two segments can result in each segments taking about 50% of the work, where then SITV=0.5. However splitting into: 1) three equal sized complementary segments can result in each segment taking about 33% of the work, where then SITV=0.66, 2) three unequal sized complementary segments with a first segment taking 50% (SITV=0.5), a second segment taking 25% (SITV=0.75), and a third segment taking 25% (SITV=0.75), and 3) three unequal sized complementary segments with a first segment taking 50% (SITV=0.5), a second segment taking 30% (SITV=0.7), and a third segment taking 20% (SITV=0.8). The ranking of the three alternate topologies with three segments can result in ranking the first alternate higher based on the (SITV=0.66>SITV=0.5), then the second alternate where the first segment SITV=0.5 is the same as the third alternate first segment, but the second alternate second segment has an SITV=0.75 that is greater than the third alternate second segment of 0.70. One of skill in the art will appreciate that there are nearly an unlimited number of way to rank the permutations and that all such ranking techniques are asserted as being within the scope of the instant disclosure even where not explicitly recited for the sake of clarity and brevity. It is further noted that the rankings can inherently reflect asymmetric loading of a portion of the initial key space, e.g., $L_i^1$ can be experiencing a different load than other portions of the key space, $L_i^2 \ldots L_i^n$, and, as such, computed scores can comprise this difference in load at each of the n portions of the initial segment key space. Returning to example 302, the load on key=0.08 can be much greater than the other portion of the segment and scoring and/or ranking can therefore inherently reflect this asymmetric loading of the initial segment key space, e.g., the load for the sub-range comprising 0.08 will be the same as for the initial segment because no other part of the initial segment is indicated as demanding work.

In an aspect, the ranking can also include monetary or other costs of instantiating additional processing instances. As can be appreciated by one of skill in the art, given free an unlimited computer resources, it can be possible to have every portion of the key space allocated to a separate segment with its own processing instance because this can result in the least greatest improvement over having more limited resources serving a segment that covers a greater portion of the key space. However, computing resources come at a cost, including greater monetary and other expenses such as additional space for the components, more maintenance, etc. Generally, use of fewer computing resources can be therefore desirable. The ranking can reflect monetary and other costs of additional processing instances to afford balance to how many additional segments are to be created and supported by one or more additional processing instance. Returning to the above example, it can be more favorable, e.g., higher ranked, to use two segments, rather than three segments to scale up a burdened segment, so long as the two segments provide satisfactory levels of performance. In some embodiments, cost information can be comprised in system KPI(s) 432. The cost can, in some embodiments, reflect different costs for different processing instances, for example, where a first processing instance employs a low cost, mainstream, processor and a second processing instance employs a high cost, state of the art processor, an alternate topology employing the lower cost processor can have an increased rank over a similar topology employing the higher cost processor.

OES scaling component 470 can receive ranking, scores, etc., via alternate OES topology permutation ranking component 460, loading via system load monitor com 440, etc., and can select an alternate topology, if one exists that can satisfy the scaling rule. This alternate topology can then be facilitated via generation of OES topology modification information 434.

Figure 5:
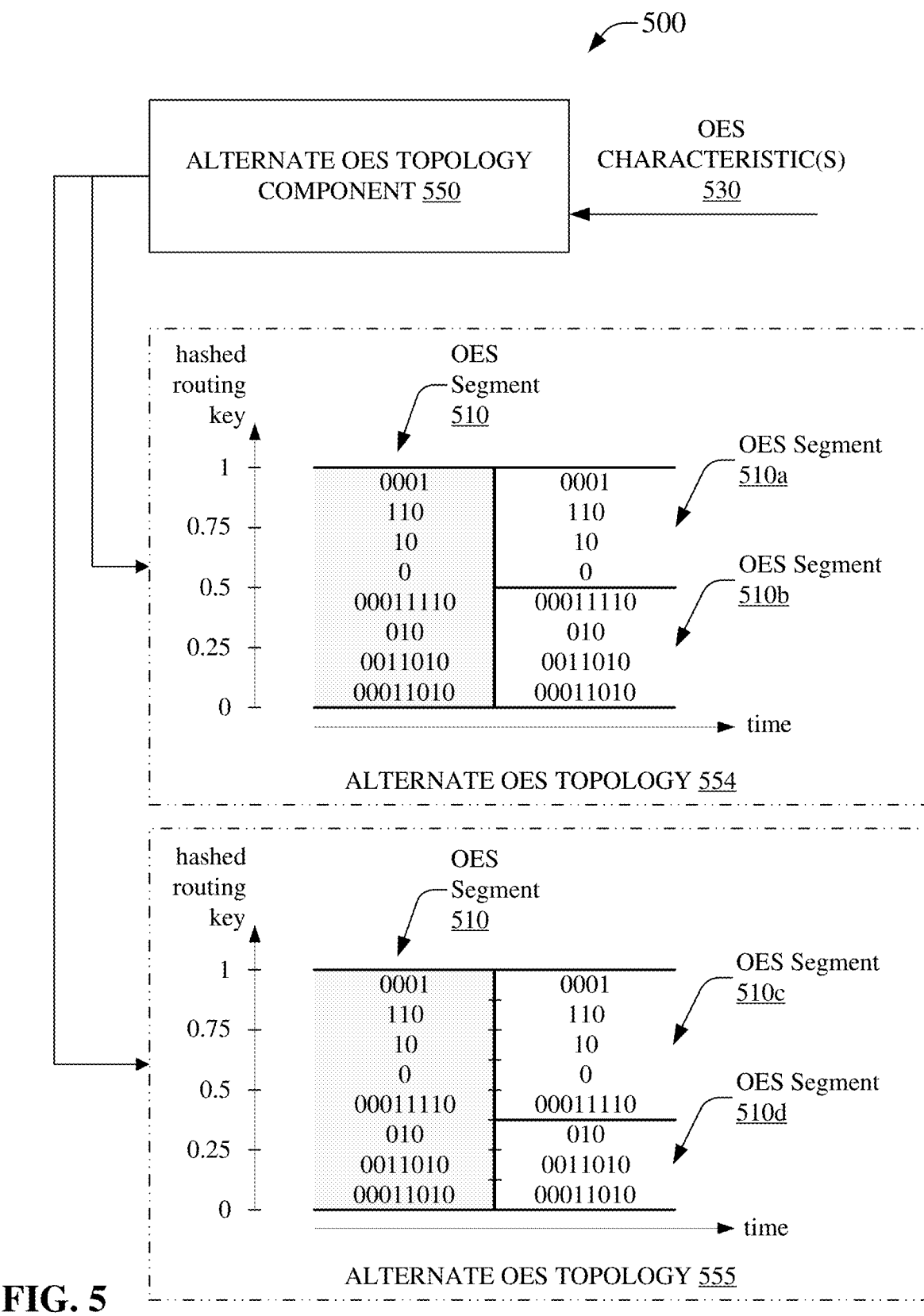
FIG. 5 is an illustration of an example system that can facilitate scaling of an ordered event stream via generation of an alternate OES topology, in accordance with aspects of the subject disclosure.

FIG. 5 is an illustration of a system 500, which can facilitate scaling of an ordered event stream via generation of an alternate OES topology, in accordance with aspects of the subject disclosure. System 500 can comprise alternate OES topology component 550 that can determine alternate OES topologies. The determination of the alternate OES topologies can be based on OES characteristic(s) 530. As an example, an OES can comprise OES segment 510. OES segment 510 can be viewed as comprising 8 parts, e.g., n=8. The relative level of work in each part of OES segment 510 can be reflected in the length of the binary string for each of the eight parts, e.g., '0001' indicates more work than '110' but less work than '00011110', etc. In alternate OES topology 554, e.g., determined via alternate OES topology component 550, scaling can result in two segments, e.g., OES segments 510a and 510b. Similarly, in alternate OES topology 555, e.g., again determined via alternate OES topology component 550, scaling can result in two segments, e.g., OES segments 510c and 510d.

In an aspect, both OES segments 510a and 510b and OES segments 510c and 510d provide coverage of the key space of OES segment 510, as is illustrated. However, OES segments 510a and 510c evenly split the key space, e.g., OES segments 510c and 510d each comprise four parts, while and OES segments 510c and 510d do not even split the key space, e.g., OES segment 510c comprises five parts and 510d comprises three parts. As such, these can be treated as different alternate OES topologies that can be determined to provide different benefits to the OES system if implemented.

Turning to alternate OES topology 554, if we let each illustrated binary bit indicate one unit of work, then the combined work for OES segment 510a can be 10 units, e.g., '0001'=4, '110'=3, '10'=2, and '0'=1, then 4+3+2+1=10. Similarly, OES segment 510b can consume 26 units of work, e.g., computing resources from a processing instance. As such, while the key space is evenly divided, the work load of the divided key space is unbalanced. This can result in a processing instance performing more work for OES segment 510b than another processing instance would perform for OES segment 510a. If each processing instance is similar in computing resources, supporting OES segment 510b will more heavily burden the corresponding processor instance than OES segment 510a will. In situations where the processing instances are not roughly uniform, this can be less of an issue, however, it can be desirable to balance processing instance workload where computing resources can be purchased in fixed increments. As an example, in a cloud computing environment, processing can be purchased incrementally and it can be desirable to purchase fewer increments, again for cost reasons, than more increments. As such, it can be desirable to balance work load rather than simply balancing division of key space. In the above example, to get a balance work load, more increments of computing resources would need to be purchased for OES segment 510*b* than for OES segment 510*a*, even though the key space is evenly divided.

In contrast, for alternate OES topology 555, if we again let each illustrated binary bit indicate one unit of work, then the combined work for OES segment 510*c* can be 18 units. Similarly, OES segment 510*d* can consume 18 units of work. As such, while the key space is not evenly divided, the work load of the divided key space is balanced. This can result in a processing instance performing similar work for OES segment 510*c* as would be performed by another processing instance for OES segment 510*d*. Alternate OES topology 555 can illustrate better balance of work load rather than mere even division of key space.

In an aspect, for an $i^{th}$ segment with a load $L_i$, the segment's range of hashed routing keys can be split into n equal parts/subranges. In an embodiment n can be a power of 2, although it is not so limited. In system 500 for example, as is noted, n is set to 8. A load is determined independently for each of the n segment parts ($L_i^1 \ldots L_i^n$). Balanced division of anticipated work, instead of balanced key space division, can be expressed as:

$$\frac{\sum_{j=1}^{m} L_i^j}{\sum_{j=m+1}^{n} L_i^j},$$

for a natural number m between 1 and n. The closer this ratio is to 1, the more balanced the work load in the proposed scaled segments. As an example, in alternate OES topology 554, where m=4, the ratio is 10/26, while in OES topology 555, where m=5, the ratio is 18/18. In an aspect, this ratio can be employed in ranking different alternate OES topologies, e.g., via ranking component 460, etc.

Figure 6:
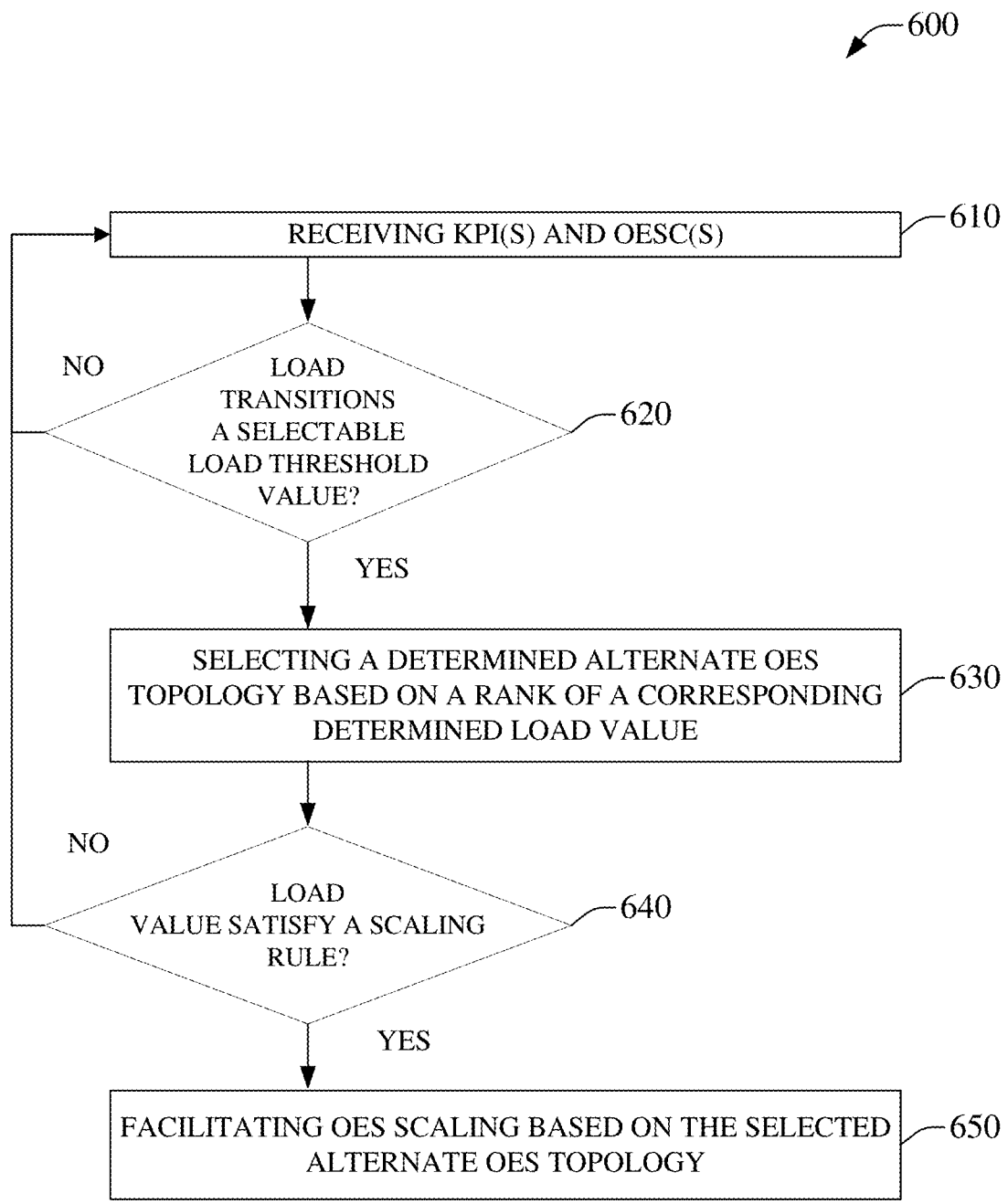
FIG. 6 is an illustration of an example method enabling scaling of an ordered event stream, in accordance with aspects of the subject disclosure.
Figure 7:
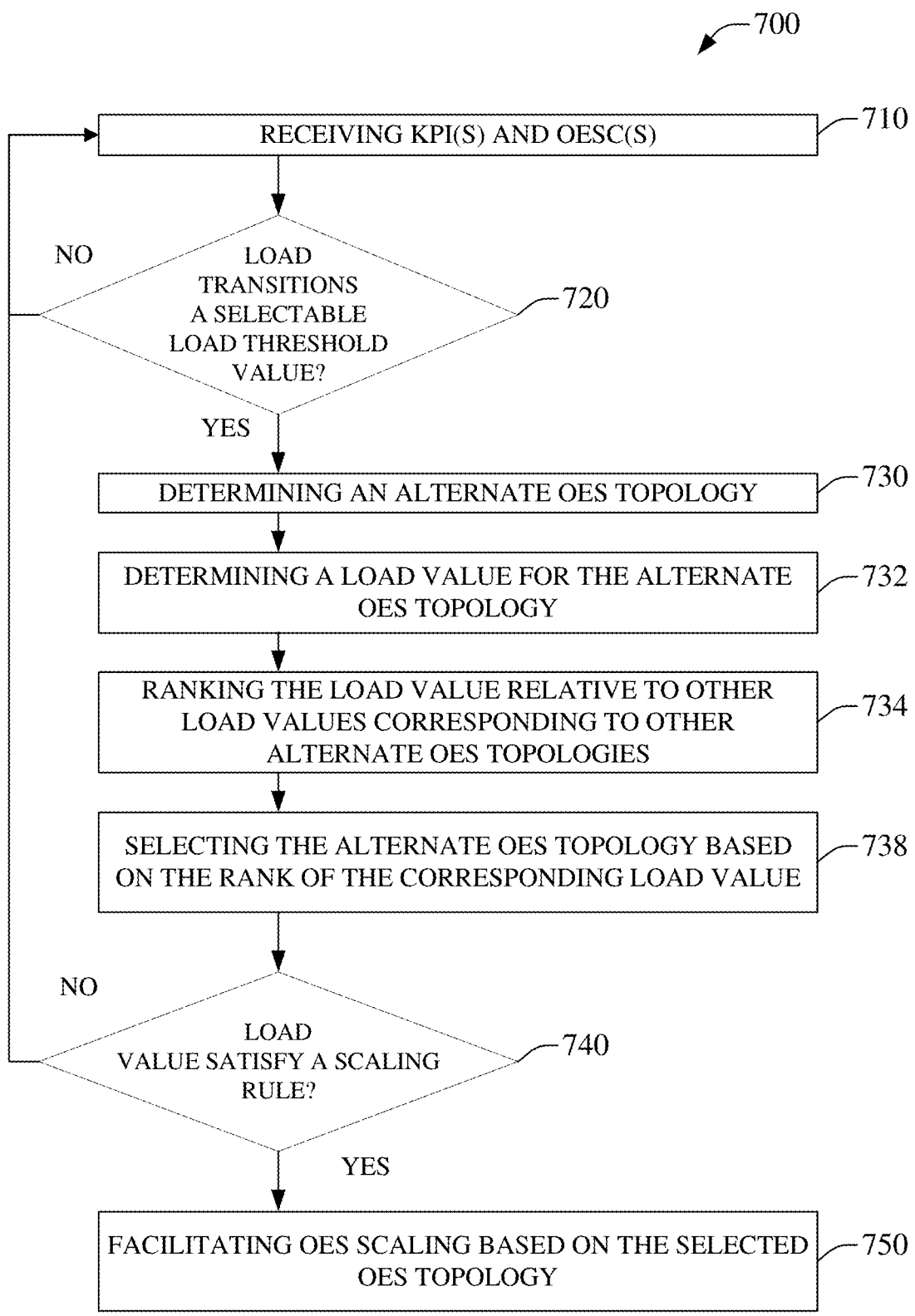
FIG. 7 is an illustration of an example method facilitating scaling of an ordered event stream based on ranking alternate OES topologies, in accordance with aspects of the subject disclosure.
Figure 8:
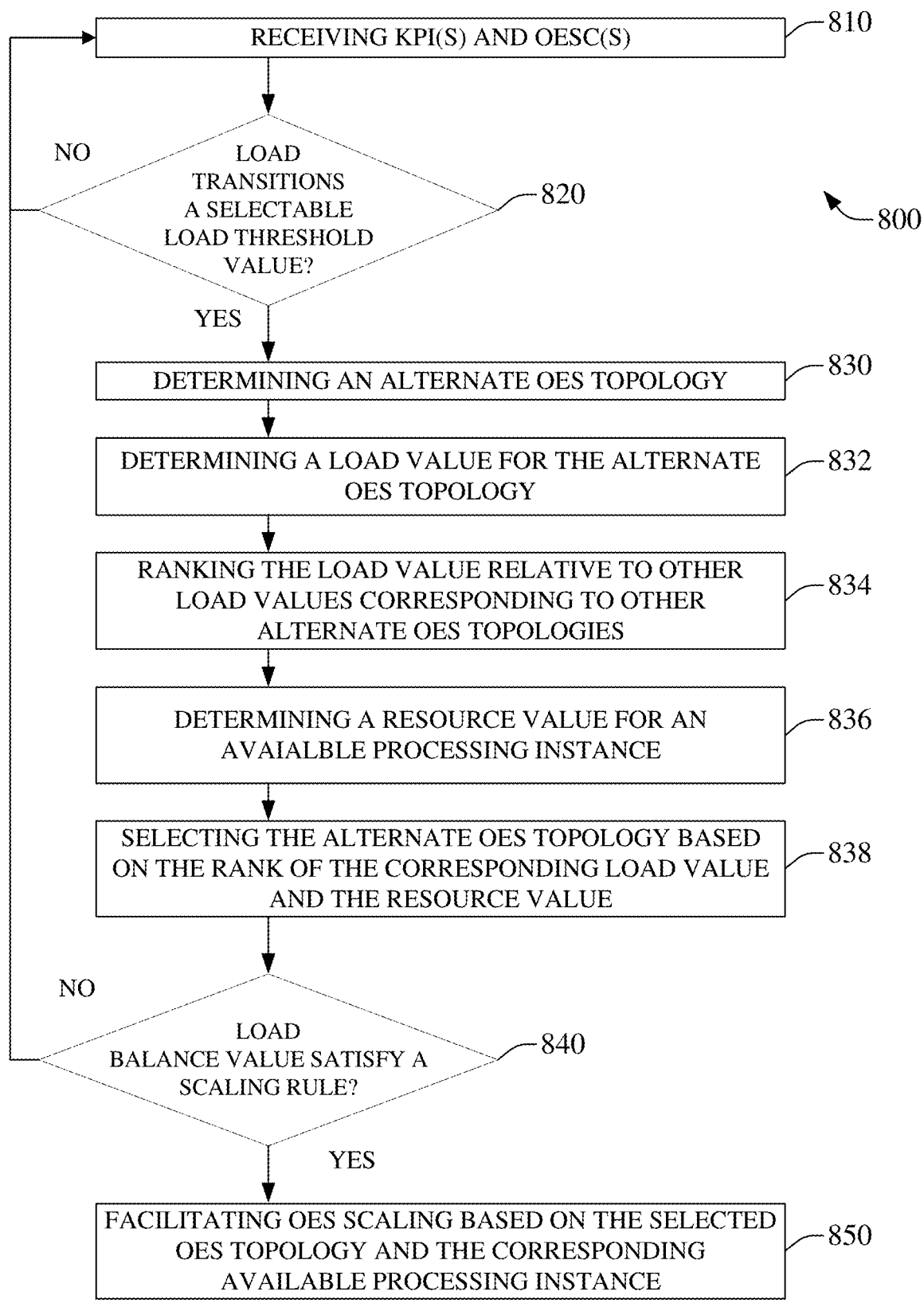
FIG. 8 is an illustration of an example method facilitating scaling of an ordered event stream based on ranking alternate OES topologies and performance of an available processing instance, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate based on ranking alternate OES topologies, in accordance with aspects of the subject disclosure. At 610, method 600 can comprise receiving an OES storage system KPI(s) and an OES characteristic (OESCs). Example OES characteristics can comprise a current computing resource demand, a count of segments comprising an OES, a distribution of work among the segments, a topology of an OES, a historical workload of one or more segments of an OES, etc. Example storage system KPIs can comprise loading of a processing instance, threshold values for current and/or available computing resources, etc.

At 620, method 600 can determine if a load of an OES segment transitions a selectable load threshold value. As an OES segment is written to or read from, the load on computing resources, e.g., on a processing instance, etc., supporting the OES segment is generated. As the number of operations on the OES segment increases, load can increase and, correspondingly, as the number of operations decreases, the load can decrease. In an aspect, the complexity of the operation can also affect the load, e.g., writing/reading an event that has a low count of data bits can be less of a load than writing/reading an event that has a high count of data bits. As an OES segment load increases, it can begin to tax the supporting processor instance and, in some situations can exceed the performance of the supporting processor instance. As such, it can be desirable to increase the computing power of desiderated to supporting the OES segment. However, due to the ordered nature of an OES, typically no more than one processing instance can support an OES segment. As such, the OES segment can be scaled, resulting in two or more new segments that can be less demanding on their associated processing instance, e.g., a loaded segment can be split into two or more less loaded segments which can each be supported by a separate processing instance to preserve ordering of events in any new segments.

Where the load of the OES segment transitions a selectable load threshold value at 620, method 600 can advance to 630 where selecting a determined alternate OES topology based on a rank of a corresponding determined load value can be performed. The determined alternate OES topology can be one of a group of alternate OES topologies. The alternate OES topologies can represent permutations of n parts of the loaded OES segment, e.g., an $i^{th}$ segment of an OES having a load $L_i^1$ that can be divided into n segment parts ($L_i^1 \ldots L_i^n$) and these segment parts can be combined into different alternate topologies, e.g., topological permutations. As an example, where n=2, $L_i = L_i^1 + L_i^2$. In some embodiments, $L_i^1$ and $L_i^2$ can be selected, for example, such that $L_i^1$ covers the key space from 0 to 0.05 and $L_i^2$ covers the key space from 0.05 to 1.0. The load value can then be expressed as:

$$\frac{\sum_{j=1}^{m} L_i^j}{\sum_{j=m+1}^{n} L_i^j},$$

for a natural number m between 1 and n.

At 640, method 600 can comprise determining if the load value satisfies a scaling rule. The scaling rule can be $\max(L_i^1, L_i^2) < (1-SITV)*L_i$, where SITV can be a selectable value representing an amount of improvement that can occur by scaling the $i^{th}$ segment. As an example, where the $i^{th}$ segment is uniformly loaded across its key space, then dividing the $i^{th}$ segment into two new segments can reduce the load by 50%. This can be seen by the $\max(L_i^1, L_i^2)=\max$ (half the load of the $i^{th}$ segment for $0 \geq \text{key} > 0.5$, half the load of the $i^{th}$ segment for $0.5 > \text{key} \geq 1$) yielding half the load of the $i^{th}$ segment for either resulting new segment. This can be less than $(1-\text{SITV})^*L_i$ where SITV is selected to be greater than 0.5.

Where the load value satisfies the scaling rule, method 600 can advance to 650 and can comprise facilitating OES scaling based on the selected alternate OES topology. At this point method 600 can end. In an aspect, the facilitating can comprise enabling access to OES topology modification information, e.g., OESTMI 334, 434, etc.

As can be understood in method 600, in response to an indication that an OES segment is beginning to approach a demand for computing resources that can strain a corresponding processing instance, an alternate OES segment topography can be selected based on a rank of the alternate OES segment topography among other alternate OES segment topographies. In an embodiment, rank can be based on how well the alternate OES segment topography will balance the loads of the resulting new segments. In other embodiments, for example where available processing instances are not uniform, etc., the rank can be based on the how the processing instance corresponding to new segments will perform relative to each other. In some embodiment, for example where scaling will result in more than two new segments, the ranking can be more advanced as is disclosed elsewhere herein. Method 600 will still not implement the scaling if the selected alternate OES segment topography does not satisfy a scaling rule, e.g., the alternate OES segment topography should provide better than a selectable level of improvement to the loading of the processing instances. In an aspect, this scaling rule can avoid scaling where little benefit is gained from the scaling, see FIG. 2 and corresponding text for example.

FIG. 7 is an illustration of an example method 700, which can facilitate scaling of an ordered event stream based on ranking alternate OES topologies, in accordance with aspects of the subject disclosure. At 710, method 700 can comprise receiving an OES storage system KPI(s) and an OES characteristic (OESCs). At 720, it can be determined if a load, e.g., $L_i$, of an OES segment, e.g., the $i^{th}$ segment, transitions a selectable load threshold value.

Where $L_i$ transitions a selectable load threshold value at 720, method 700 at 730 can comprise determining an alternate OES topology. An alternate OES topology can divide the $i^{th}$ segment into two or more new segments corresponding to the key space of the $i^{th}$ segment. As an example with two new segments, if the $i^{th}$ segment has a key space from 0 to 1, then a first new segment has a key space from 0 to m and a second new segment has a key space from >m to 1. As will be appreciated m can be anywhere between 0 and 1 and so many alternate OES topologies are possible depending on the value of m. Typically, the $i^{th}$ segment can be divided into n parts corresponding to n equal portions of the key space. As an example, where n=4 for a key space from 0 to 1, there can be four segment parts, each covering 25% of the key space, that can be combined in different permutations to yield different alternate OES topologies. Continuing the example, alternate OES topologies with two new segments can include (0-0.25, 0.25-1.0), (0-0.5, 0.5-1.0), and (0-0.75, 0.75-1.0) where the notation indicates (key space taken by the first new segment, key space taken by the second new segment).

At 732, method 700 can comprise determining a load value for the alternate OES topology from 730. A load on each new segment can be determined based on the sum of the loads of the portions of key space taken by a new segment. Where load $L_i$ can be divided into n segment parts each having a corresponding load $(L_i^1 \ldots L_i^n)$, these segment parts loads can be combined to indicate the load, as an example, where n=4, $L_i=L_i^1+L_i^2+L_i^3+L_i^4$. As such, the load for an alternate OES topology of (0-0.25, 0.25-1.0)= $(L_i^1,(L_i^2+L_i^3+L_i^4))$. Similarly, the load for (0-0.5, 0.5-1.0)= $((L_i^1+L_i^2), (L_i^3+L_i^4))$. Correspondingly, the load for (0-0.75, 0.75-1.0)=$((L_i^1+L_i^2+L_i^3), (L_i^4))$. Similarly, where more than two new segments are comprised in the alternate OES topology, the load can be just as easily determined, e.g., an example three segment alternate OES topology can be (0-0.25, 0.25-0.5, 0.5-1.0) and have a load represented by $((L_i^1), (L_i^2), (L_i^3+L_i^4))$.

Method 700 can comprise, at 734, ranking the load values relative to other load values corresponding to other alternate OES topologies. As an example, where the load for $(L_i^1 \ldots L_i^n)$ is uniform, and where additional processing instances are also uniform, then balancing the loads applied to new processing instances can be achieved by selecting an m that causes the load expression $$\frac{\sum_{j=1}^{m} L_i^j}{\sum_{j=m+1}^{n} L_i^j},$$

for a natural number m between 1 and n to be closest to 1, e.g., each new segment takes on an equal portion of the work. If we use the three alternate OES topologies (0-0.25, 0.25-1.0), (0-0.5, 0.5-1.0), and (0-0.75, 0.75-1.0), and we let each of $(L_i^1 \ldots L_i^n)$ be equal, then the load expression gives (1/3) for the first alternate OES topology, (2/2) for the second alternate OES topology, and (3/1) for the third alternate OES topology. The corresponding ranking can be 2nd, 1st, 3rd alternate OES topology because the 2nd is closest to 1 indicating that each resulting segment would shoulder a similar amount of work, while the 1st and 3rd topologies would more heavily load one of their two new segments. As can be appreciated, different ranking techniques can be employed when there can be more than two new segments resulting from scaling, where processing instances are not uniform, etc. At 738, method 700 can comprise selecting the alternate OES topology based on the rank of the corresponding load value.

At 740, method 700 can comprise determining if the load value satisfies a scaling rule. The scaling rule can be $\max(L_i^1, L_i^2)<(1-\text{SITV})^*L_i$, where SITV can be a selectable value representing an amount of improvement that can occur by scaling the $i^{th}$ segment. As an example, where the $i^{th}$ segment is uniformly loaded across its key space, then dividing the $i^{th}$ segment into two new segments can reduce the load by 50%. This can be seen by the $\max(L_i^1, L_i^2)=\max$ (half the load of the $i^{th}$ segment for $0 \geq \text{key} > 0.5$, half the load of the $i^{th}$ segment for $0.5 > \text{key} \geq 1$) yielding half the load of the $i^{th}$ segment for either resulting new segment. This can be less than $(1-\text{SITV})^*L_i$ where SITV is selected to be greater than 0.5.

Where the load value satisfies the scaling rule, method 700 can advance to 750 and can comprise facilitating OES scaling based on the selected alternate OES topology. At this point method 700 can end. In an aspect, the facilitating can comprise enabling access to OES topology modification information, e.g., OESTMI 334, 434, etc.

FIG. 8 is an illustration of an example method 800, which can enable scaling of an ordered event stream based on ranking alternate OES topologies and performance of an available processing instance, in accordance with aspects of the subject disclosure. At 810, method 800 can comprise receiving an OES storage system KPI(s) and an OES characteristic (OESCs). At 820, it can be determined if a load, e.g., $L_i$, of an OES segment, e.g., the $i^{th}$ segment, transitions a selectable load threshold value. Method 800 can advance to 830 where $L_i$ transitions a selectable load threshold value at 820.

At 830, method 800 can comprise determining an alternate OES topology. An alternate OES topology can divide the $i^{th}$ segment into two or more new segments corresponding to the key space of the $i^{th}$ segment. Typically, the $i^{th}$ segment can be divided into n parts corresponding to n equal portions of the key space. At 832, method 800 can comprise determining a load value for the alternate OES topology. The load can be determined based on the sum of the loads of the portions of key space taken by a new segment. Where load $L_i$ can be divided into n segment parts each having a corresponding load ($L_i^1 \ldots L_i^n$), these segment part loads can be combined to indicate the load. Further, at 834, ranking the load values relative to other load values corresponding to other alternate OES topologies can be performed. In an embodiment, a difference between load values for new segments can be employed in ranking the alternate OES topologies, e.g., a load delta value between new segments comprising an alternate OES topology. As can be appreciated, other ranking techniques can be employed.

At 836, method 800 can comprise, determining a resource value for an available processing instance. While it can often be the assumption that available processing instances are equivalent, this can often not be the situation. As an example, a OES storage service can employ different generations of server hardware that can have substantially different performance characteristics, costs of operation, etc. As such, not all processing instances are required to be equivalent. However, in contrast, large organization that, for example, deploy cloud computing resources can often offer virtualized processing instances incrementally, in which case the instances can be similar. In some embodiments, the resource value, as noted hereinabove, can be employed in determining the ranking, rather than as a separate feature as indicated in this method.

At 838, method 800 can comprise selecting the alternate OES topology based on the rank of the corresponding load value and the resource value. As an example, an alternate OES topology can be (0-0.25, 0.25-1.0), which, as is indicated herein above, more can more heavily load the second new segment than the first new segment where ($L_i^1 \ldots L_i^n$) is uniform, e.g., the first new segment is predicted to have ⅓ the work of the second new segment in this example. However, where an available processing resource can provide three times the processing work, selecting this alternate topology remains well balanced where it employs the indicated processing instance.

At 840, method 800 can comprise determining if the load value satisfies a scaling rule. The scaling rule can be $\max(L_i^1, L_i^2) < (1-SITV)*L_i$, where SITV can be a selectable value representing an amount of improvement that can occur by scaling the $i^{th}$ segment. As an example, where the $i^{th}$ segment is uniformly loaded across its key space, then dividing the $i^{th}$ segment into two new segments can reduce the load by 50%. This can be seen by the $\max(L_i^1, L_i^2)=\max$ (half the load of the $i^{th}$ segment for $0 \geq key > 0.5$, half the load of the $i^{th}$ segment for $0.5 > key \geq 1$) yielding half the load of the $i^{th}$ segment for either resulting new segment. This can be less than $(1-SITV)*L_i$ where SITV is selected to be greater than 0.5.

Where the load value satisfies the scaling rule, method 800 can advance to 850 and can comprise facilitating OES scaling based on the selected alternate OES topology. At this point method 800 can end. In an aspect, the facilitating can comprise enabling access to OES topology modification information, e.g., OESTMI 334, 434, etc.

Figure 9:
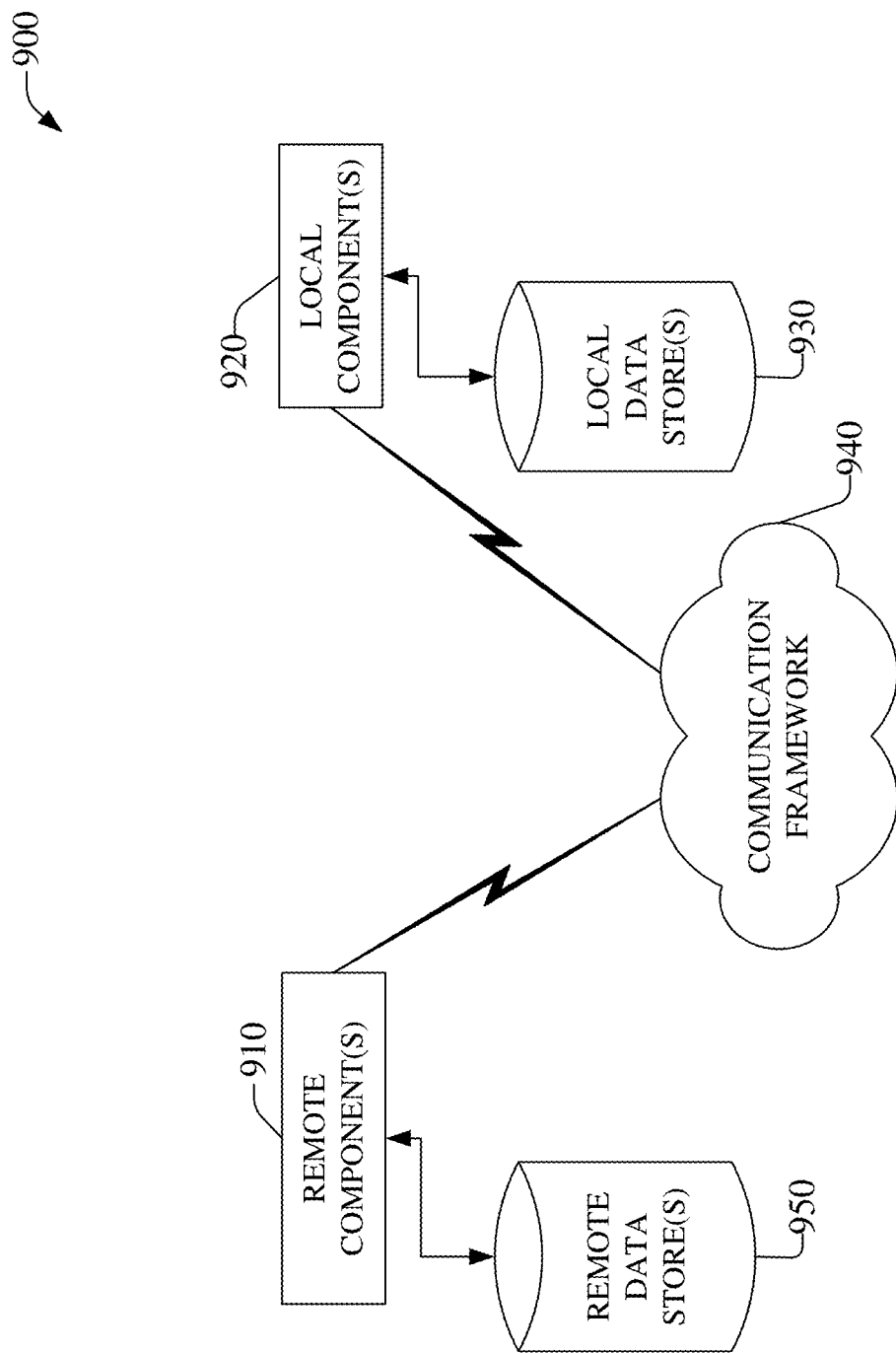
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, a remotely located processor device comprised in processor component 104, a remotely located device comprised in stream topology component 120, 320, 420, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, a processor device comprised in processor component 104, a device comprised in stream topology component 120, 320, 420, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, OESCs 330, 430, 530, etc., system KPIs 332, 432, etc., write(s) 106, read(s) 107, OES topology modification information 334, 434, etc., can be communicated via communication framework 940 among components of an OES storage network 100, 200, 300, 400, 500, etc., e.g., to facilitate adapting, altering, modifying, etc., a topology of an OES, as disclosed herein.

Figure 10:
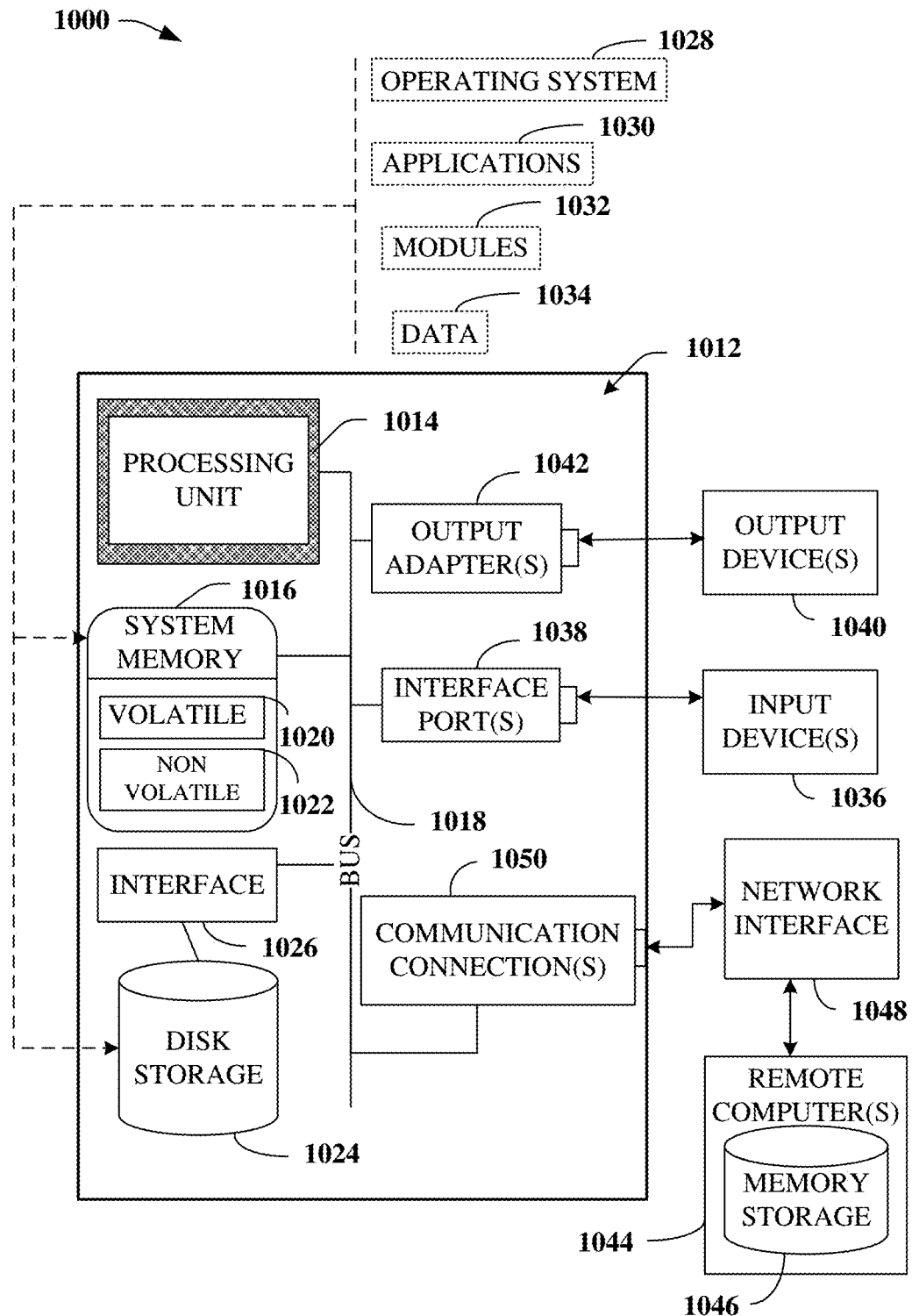
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, stream topology component 120, 320, 420, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising receiving an indication that an existing segment of an ordered event stream of an ordered event stream storage system has traversed a threshold loading. The operations can further comprise receiving a ranking of alternate ordered event stream topologies that comprise an alternate ordered event stream topology and determining that the alternate ordered event stream topology satisfies a rule related to allowing implementation of the altered ordered event stream topology based on an expected loading for the alternate ordered event stream topology. The operations can additionally comprise enabling modification of the existing segment based on the altered ordered event stream topology, wherein the altered ordered event stream topology is selected based on the rank of the altered ordered event stream topology.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving an indication corresponding to a threshold amount of resource demand occurring in an existing portion of an ordered event stream of an ordered event stream storage system, wherein the ordered event stream has an initial topology, and wherein the initial topology has a characteristic selected from a group of characteristics comprising a count of segments and an allocation of key space among the segments of the ordered event stream;
determining an alternate ordered event stream topology;
determining an expected loading of computing resources based on the alternate ordered event stream topology; and
in response to determining that the alternate ordered event stream topology satisfies a rule related to allowing implementation of the altered ordered event stream topology based on the expected loading, enabling implementation of the altered ordered event stream topology.

2. The system of claim 1, wherein the alternate ordered event stream topology is selected from alternate ordered event stream topologies based on a rank of the ordered event stream topology among the alternate ordered event stream topologies.

3. The system of claim 2, wherein the rank is based on the expected loading for the alternate ordered event stream topology.

4. The system of claim 1, wherein the altered ordered event stream topology comprises at least two new ordered event stream segments.

5. The system of claim 4, wherein the altered ordered event stream topology comprises at least three new ordered event stream segments.

6. The system of claim 4, wherein a first new ordered event stream segment of the at least two new ordered event stream segments assumes a first portion of a key space of the existing portion of the ordered event stream and a second new ordered event stream segment of the at least two new ordered event stream segments assumes a second portion of the key space of the existing portion of the ordered event stream, and wherein the first portion of the key space of the existing portion of the ordered event stream is adjacent to, but does not overlap, the second portion of the key space of the existing portion of the ordered event stream.

7. The system of claim 6, wherein the first portion is of a different key space size than the second portion.

8. The system of claim 6, wherein a first expected loading from the first new ordered event stream segment is the same expected loading as a second expected loading from the second new ordered event stream segment, wherein the first new ordered event stream segment is supported by a first processing instance, wherein the second new ordered event stream segment is supported by a second processing instance, and wherein the wherein the first processing instance and the second processing instance have a same level of performance.

9. The system of claim 6, wherein a first expected loading from the first new ordered event stream segment is the same expected loading as a second expected loading from the second new ordered event stream segment, wherein the first new ordered event stream segment is supported by a first processing instance, wherein the second new ordered event stream segment is supported by a second processing instance, and wherein the wherein the first processing instance and the second processing instance have a different level of performance.

10. The system of claim 1, wherein the determining that the alternate ordered event stream topology satisfies the rule related to allowing implementation of the altered ordered event stream topology based on the expected loading comprises determining that the expected loading would traverse a threshold level of performance.

11. The system of claim 1, wherein the implementation of the altered ordered event stream topology results in scaling the existing portion of the ordered event stream in response to opening at least two new ordered event stream segments based on the altered ordered event stream topology.

12. The system of claim 1, wherein the determining the alternate ordered event stream topology occurs in response to the receiving the indication corresponding to the threshold amount of resource demand occurring in the existing portion of the ordered event stream.

13. The system of claim 1, wherein the determining the alternate ordered event stream topology occurs prior to the receiving the indication corresponding to the threshold amount of resource demand occurring in the existing portion of the ordered event stream.

14. A method, comprising:
performing, by a system comprising a processor, a first iteration of operations comprising:
in response to receiving, by the system, an indication that an existing segment of an ordered event stream of an ordered event stream storage system has traversed a threshold loading of a processing instance supporting the existing segment of the ordered event stream, determining a ranking of alternate ordered event stream topologies that comprise an alternate ordered event stream topology, wherein the alternate ordered event stream topology is a different topology than an initial ordered event stream topology, and wherein a characteristic of the initial ordered event stream topology is selected from a group of characteristics comprising a count of segments and an allocation of key space among the segments of the ordered event stream;
in response to determining, by the system, that the alternate ordered event stream topology satisfies a rule related to allowing implementation of the altered ordered event stream topology based on an expected loading for the alternate ordered event stream topology, selecting the alternate ordered event stream topology based on the ranking; and
causing, by the system, implementation of the altered ordered event stream topology.

15. The method of claim 14, wherein the determining the ranking of alternate ordered event stream topologies comprises determining the ranking for a first alternate ordered event stream topology comprising at least two new segments.

16. The method of claim 14, wherein a first expected loading from a first new ordered event stream segment of the alternate ordered event stream topology is the same expected loading as a second expected loading from a second new ordered event stream segment of the alternate ordered event stream topology, wherein the first new ordered event stream segment supports a first portion of a key space of the existing segment, wherein the second new ordered event stream segment supports a second portion of the key space of the existing segment, and wherein the first portion and the second portion are of different key space size and abut, but do not overlap, in the key space.

17. The method of claim 14, wherein the determining the alternate ordered event stream topology occurs prior to the receiving the indication that the existing segment has traversed the threshold loading.

18. A non-transitory machine-readable medium, comprising executable instructions that, when executed by a processor, facilitate performance of operations, comprising:
receiving an indication that an existing segment of an ordered event stream of an ordered event stream storage system has traversed a threshold loading of a processing instance supporting the existing segment of the ordered event stream;
receiving a ranking of alternate ordered event stream topologies that comprise an alternate ordered event stream topology, wherein the alternate ordered event stream topology is a different topology than an initial ordered event stream topology, and wherein a characteristic of the initial ordered event stream topology is selected from a group of characteristics comprising a count of segments and an allocation of key space among the segments of the ordered event stream;
determining that the alternate ordered event stream topology satisfies a rule related to allowing implementation of the altered ordered event stream topology based on an expected loading for the alternate ordered event stream topology; and
enabling modification of the existing segment based on the altered ordered event stream topology, wherein the altered ordered event stream topology is selected based on the rank of the altered ordered event stream topology.

19. The non-transitory machine-readable medium of claim 18, wherein the alternate ordered event stream topology comprises at least a first new ordered event stream segment and a second new ordered event stream segment, wherein the first new ordered event stream segment supports a first portion of a key space of the existing segment, wherein the second new ordered event stream segment supports a second portion of the key space of the existing segment, and wherein the first portion and the second portion are of different key space size and abut, but do not overlap, in the key space.

20. The non-transitory machine-readable medium of claim 19, wherein a first expected loading from the first new ordered event stream segment is a same expected loading as a second expected loading from the second new ordered event stream segment, and wherein performance characteristic levels of processing instances corresponding to the first new ordered event stream segment and the second new ordered event stream segment are different performance characteristic levels.

* * * * *